April 13, 1965      A. L. EWING      3,177,604
FISHING LURE
Filed Aug. 6, 1963
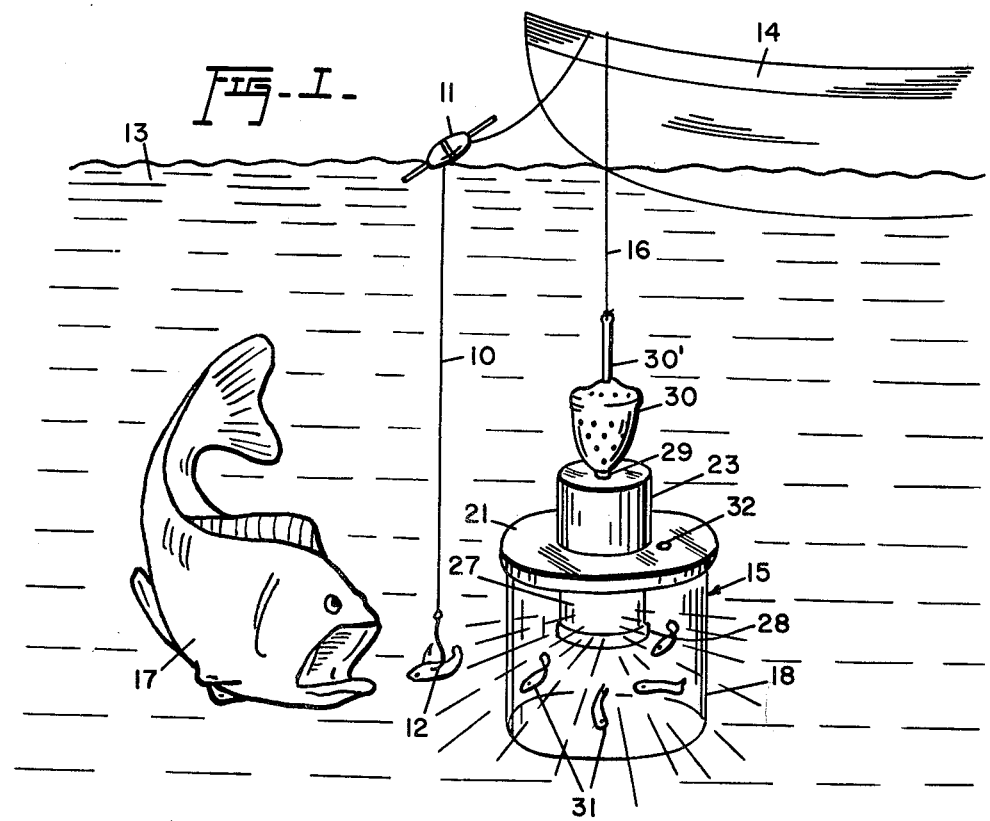
FIG-1-
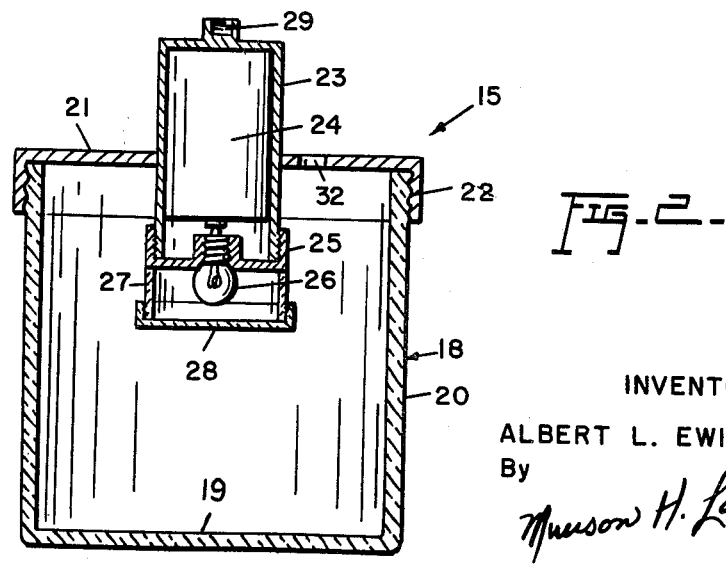
FIG-2-
INVENTOR:
ALBERT L. EWING
By
*Munson H. Lane*
ATT'Y.

3,177,604
FISHING LURE
Albert Lee Ewing, 837 N. Cain St., Stephenville, Tex.
Filed Aug. 6, 1963, Ser. No. 300,266
1 Claim. (Cl. 43—17.5)

This invention relates to new and useful improvements in fisherman's appliances, and more particularly, the invention concerns itself with a device for attracting fish to a baited hook.

The principal object of the invention is to provide a device of this type which may be lowered into the water to a position adjacent a baited hook carried by a separate line, the device being equipped with means for attracting fish to itself and, consequently, to the baited hook adjacent thereto, so that fish may be caught on the baited hook without disturbance of the device itself.

The fish attracting device of the invention includes, as one of its features, a transparent housing which is adapted to contain live bait without permitting the same to escape into the surrounding water or be consumed by fish on the outside of the housing. As an additional fish attracting feature, the device embodies a source of light in the transparent housing, whereby the live bait in the housing as well as surrounding regions of water are illuminated. Moreover, the device is provided with an odoriferous bait member to supplement its fish attracting characteristics.

Other features of the invention reside in its simplicity of construction, efficient operation, and in its adaptability to economical manufacture.

With the foregoing more important objects and features in view and such other objects and features as may become apparent as this specification proceeds, the invention will be understood from the following disclosure taken in conjunction with the accompanying drawings, wherein like characters of reference are used to designate like parts, and wherein:

FIGURE 1 is a perspective view showing the fish attracting device of the invention in use; and FIGURE 2 is an enlarged, vertical sectional view of the device per se.

Referring now to the accompanying drawings in detail, the numeral 10 designates a conventional fishing line, equipped with the usual float 11 and a bait-equipped hook 12, the same being shown as cast into a body of water 13, as from a boat 14, or the like.

The general reference numeral 15 designates the fish attracting device of the invention, which is adapted to be lowered into the water by a separate line 16, so that it may be disposed adjacent the baited hook 12 on the line 10 for attracting fish, such as the fish indicated at 17, to the baited hook.

The fish attracting device 15 comprises a transparent housing 18, such as a glass jar, for example, having a bottom 19, a side wall 20 and an open top which is provided with a suitable, removable cover 21. The latter may be screw-threaded on the housing, as at 22.

A cylindrical casing 23 is suitably secured to and extends through the cover 21, projecting both above and below the same, and containing a source of electric current such as a dry cell or battery 24. The casing 23 is formed from metallic material and its lower end, within the housing 18, carries a screw-threaded, removable cap 25, also of metallic material, having a socket for a bulb 26 which may be energized when the cap 25 is screwed on to the casing 23 so that the bulb comes into circuit with the battery 24. An annular sleeve 27 of transparent material such as plastic, for example, is suitably secured to the cap 25 so that it encloses the bulb 26, and a screw-threaded closure 28 is removably attached to the sleeve 27 for coaction therewith in enclosing the bulb. The closure 28 is also formed from transparent material such as plastic, and it will be apparent that when the bulb is energized by the battery 24, the interior of the housing 18 as well as the surrounding regions of water into which the device 15 is lowered will become illuminated.

The upper end of the casing 23 is provided with a suitable socket 29 in which may be secured a container 30 having odoriferous bait material therein, the container having an upwardly projecting stem 30' which is suitably connected to the aforementioned line 16. By virtue of this connection, the device 15 may be lowered into the body of water 13 to assume a position adjacent the baited hook 12 on the line 10, it being understood of course, that both the lines 10 and 16 may be manipulated from the boat 14.

The housing 18 is intended to receive therein live bait, such as the minnows 31, for example, which are prevented from escaping from the housing by the cover 21 and are also protected by the cover from being devoured by the fish 17 at the outside of the housing. A suitable water passage, aperture or opening 32 is formed in the cover 21 so that fresh water may pass into the housing 18 to keep the bait 31 alive.

It will be apparent from the foregoing that when the device 15 is lowered into the body of water 13 adjacent the baited hook 12, it will attract fish by virtue of the live bait 31 in the housing 18; the light emanating from the bulb 26; and the odor from the odoriferous contents of the member 30, and when the fish, such as that indicated at 17, approach the device 15, they will also be attracted to the baited hook 12.

While in the foregoing there has been described and shown the preferred embodiment of the invention, various modifications may become apparent to those skilled in the art to which the invention relates. Accordingly, it is not desired to limit the invention to this disclosure, and various modifications may be resorted to, falling within the spirit and scope of the invention as claimed.

What is claimed as new is:

A device for attracting fish, comprising in combination a transparent jar having a closed bottom, an imperforate side wall and an open top, said jar being adapted to contain live bait, a removable cover provided on the open top of said jar for preventing the bait to escape or be consumed by fish on the outside of the jar, a vertically disposed cylindrical casing mounted centrally in said cover, said casing having an upper portion projecting above the cover and a lower portion projecting below the cover into said jar, the upper end of said casing being closed and its lower end open, a dry cell positioned in said casing, a removable cap provided on the open lower end of the casing and formed with a lamp socket, a lamp mounted in said socket in electrical contact with said battery, a transparent closure removably mounted on said cap and enclosing said lamp, said cover being provided with a water passage to communicate the interior of said jar with a surrounding body of water, an upwardly opening screw-threaded socket provided on the closed upper end of said casing, means connected to said screw-threaded socket for suspending the device in a body of water comprising a flexible line, a container for odoriferous material suspended from said line, the lower end portion of said container being screw-threaded into said upwardly opening socket.

References Cited by the Examiner

UNITED STATES PATENTS

| | | | |
|---|---|---|---|
| 636,694 | 11/99 | Pflueger | 43—17.5 X |
| 1,192,001 | 7/16 | Ryan | 43—17.5 X |
| 1,287,918 | 12/18 | Drufva | 240—10.66 |
| 2,008,004 | 7/35 | Catarau | 43—42.06 |
| 2,765,575 | 10/56 | Gfroerer | 43—44.99 |
| 2,898,698 | 8/59 | Bair | 43—17.5 |
| 3,079,721 | 3/63 | Smith | 43—17.5 |
| 3,091,882 | 6/63 | Dudley | 43—17.5 |

SAMUEL KOREN, *Primary Examiner.*

ABRAHAM G. STONE, *Examiner.*